(12) United States Patent
Stevenson

(10) Patent No.: US 7,532,222 B2
(45) Date of Patent: May 12, 2009

(54) ANTI-ALIASING CONTENT USING OPACITY BLENDING

(75) Inventor: Alexander Stevenson, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 429 days.

(21) Appl. No.: 11/124,661

(22) Filed: May 9, 2005

(65) Prior Publication Data

US 2006/0250415 A1 Nov. 9, 2006

(51) Int. Cl.
*G09G 5/00* (2006.01)
*G09G 5/02* (2006.01)

(52) U.S. Cl. .................... 345/611; 345/589; 345/592; 345/629; 345/639; 345/640

(58) Field of Classification Search ............... 345/611, 345/592, 629
See application file for complete search history.

(56) References Cited

U.S. PATENT DOCUMENTS

| 6,115,049 A * | 9/2000 | Winner et al. ............... 345/611 |
| 6,289,364 B1 * | 9/2001 | Borg et al. ................... 715/526 |
| 6,906,729 B1 * | 6/2005 | Sanz-Pastor et al. ........ 345/611 |
| 6,947,057 B2 * | 9/2005 | Nelson et al. ............... 345/611 |

OTHER PUBLICATIONS

Zhang, Hansong, "Visibility Culling Using Hierarchical Occlusion Maps," International Conference on Computer Graphics and Interactive Technique: Proceedings of the 24th Annual Conference on Computer Graphics and Interactive Techniques, p. 77-88, ACM Press/Addison-Wesley Publishing Co. 1997.*
Haeberli, Paul, "The Accumlation Buffer: Hardware Support for High-Quality Rendering", Computer Graphics, vol. 24, No. 4, Aug. 1990.
Cant, Richard, "New Anti-Aliasing and Depth of Field Techniques for Games", Department of Computing and Mathematics, The Nottingham Trent University Nottingham NGI 4BU. Email: richard.cant/david.al-dabass@ntu.ac.uk.

* cited by examiner

*Primary Examiner*—Kee M Tung
*Assistant Examiner*—Jacinta Crawford
(74) *Attorney, Agent, or Firm*—Workman Nydegger

(57) ABSTRACT

An anti-aliasing mechanism. In one aspect, one or more opacities are determined to apply to layers used to render an image. An order in which to render the layers is also determined. This order may correspond to an order in which points within the image are sampled. The first layer to render is set to an opacity that applies to it and rendered. The second layer to render is set at an opacity that applies to it and rendered on top of the first layer. In rendering the second layer, the opacities of the first and second layers are blended.

19 Claims, 9 Drawing Sheets

ANTI-ALIASING CONTENT USING OPACITY BLENDING

FIELD OF THE INVENTION

The invention relates generally to computers, and more particularly to graphics.

BACKGROUND

Anti-aliasing is used to reduce aliasing artifacts common with diagonal or curved edges in computer images. An accumulation buffer is one technique that has been used to reduce aliasing artifacts. Unfortunately, some systems do not implement or expose interfaces to use an accumulation buffer. They may not do so, for example, to reduce the number of exposed interfaces, to improve performance, or for any number of other reasons.

What is needed in such systems is another method for anti-aliasing images.

SUMMARY

Briefly, the present invention relates to anti-aliasing content. In one aspect, one or more opacities are determined to apply to layers used to render an image. An order in which to render the layers is also determined. This order may correspond to an order in which points within the image are sampled. The first layer to render is set to an opacity that applies to it and rendered. The second layer to render is set at an opacity that applies to it and rendered on top of the first layer. In rendering the second layer, the colors of the first and second layers are blended according to their opacities.

Other aspects will become apparent from the following detailed description when taken in conjunction with the drawings, in which:

DETAILED DESCRIPTION

Exemplary Operating Environment

Figure 1:
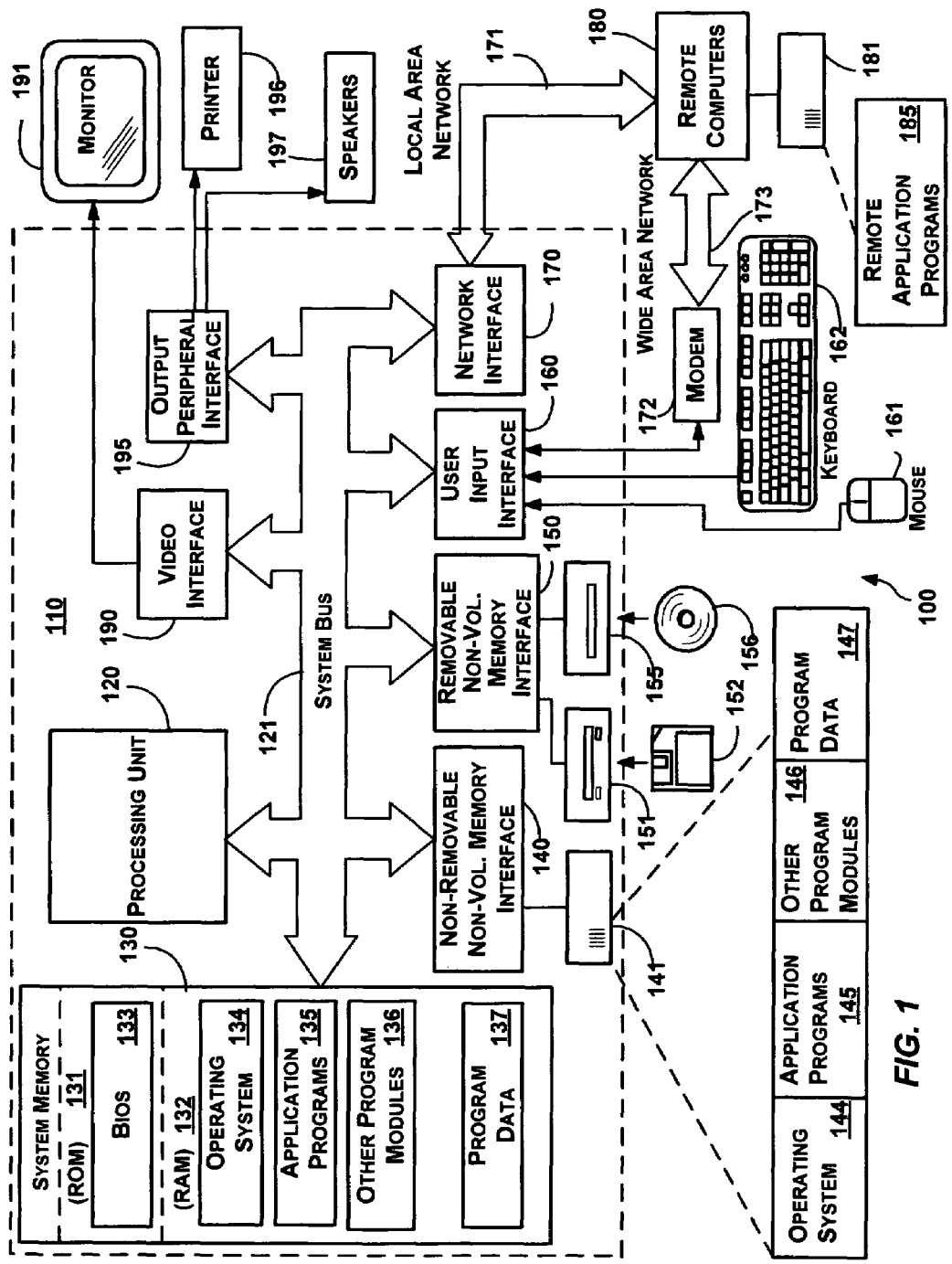
FIG. 1 is a block diagram representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a keyboard 162 and pointing device 161, commonly referred to as a mouse, trackball or touch pad.

Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Anti-Aliasing Technique

Figure 2:
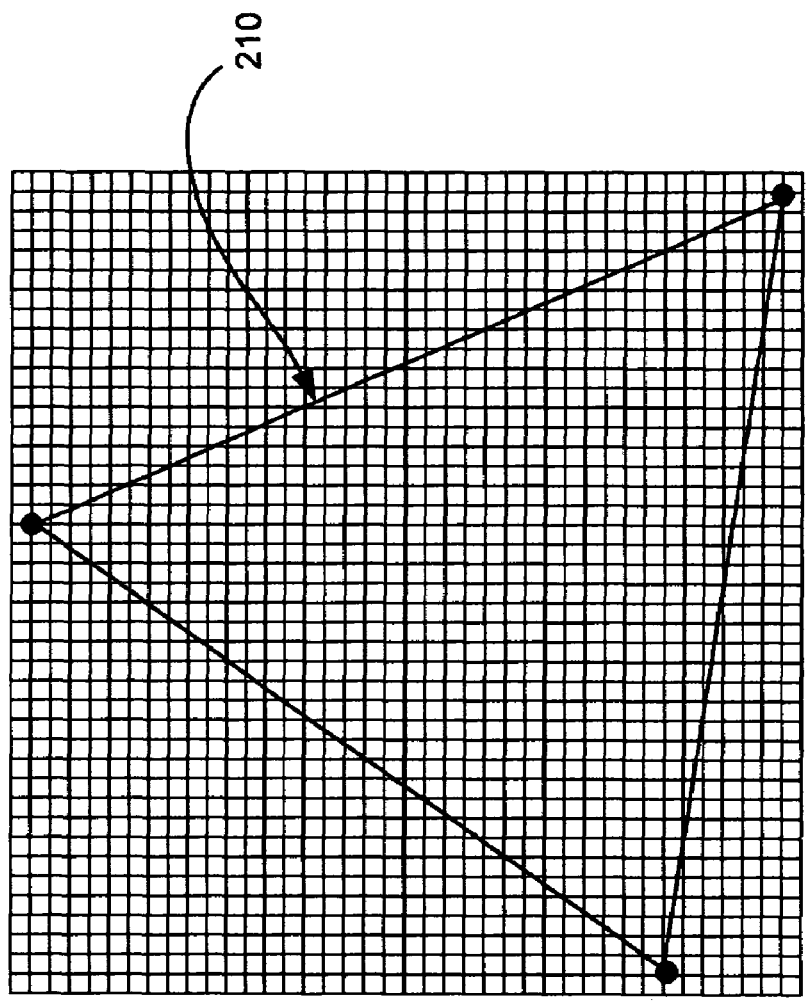
FIG. 2 is a diagram that illustrates a triangle displayed on a grid in accordance with various aspects of the invention.

FIG. 2 is a diagram that illustrates a triangle displayed on a grid in accordance with various aspects of the invention. A display may be divided into pixels arranged in a grid such as the one shown surrounding the triangle 210 and may include other pixels to the edges of the display. Typically, a computer may cause each pixel on the display to display a color independently of the colors displayed in other pixels displayed on the display.

With some renderers, pixels with pixel centers located within the triangle 210 may be caused to display colors associated with the triangle 210 while pixels with pixel centers outside of the triangle may be caused to display a background color such as black. Without anti-aliasing, this may result in a stair-stepping pattern of pixels at the borders of the triangle 210.

Objects, including three-dimensional (3D) objects, may be represented by a collection of shapes. In practice, each shape may be a triangle or be divided into triangles.

Figure 3:
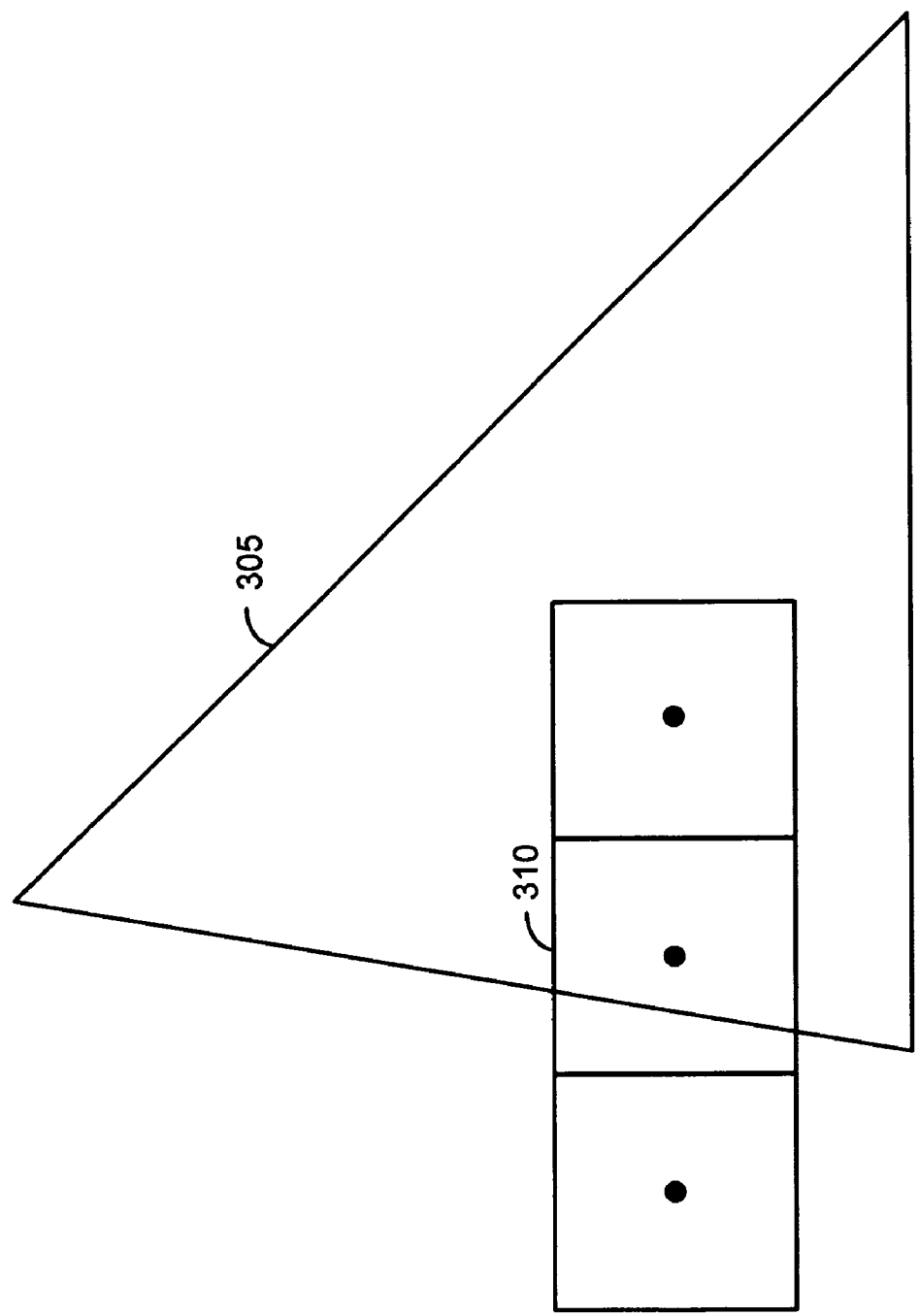
FIG. 3 is a block diagram that shows a triangle and pixels in accordance with various aspects of the invention.

FIG. 3 is a block diagram that shows a triangle and pixels in accordance with various aspects of the invention. A pixel 310 lies on the edge of the triangle 305. In rendering without anti-aliasing, the pixel 310 may be colored with a color of the triangle 305 because the center of the pixel 310 lies within the triangle. Alternatively, if the center of the pixel 310 lies just outside the triangle 305, in rendering without anti-aliasing, the pixel 310 may obtain no color from the triangle, even though up to almost fifty percent of the pixel may lie within the triangle.

Figure 4A:
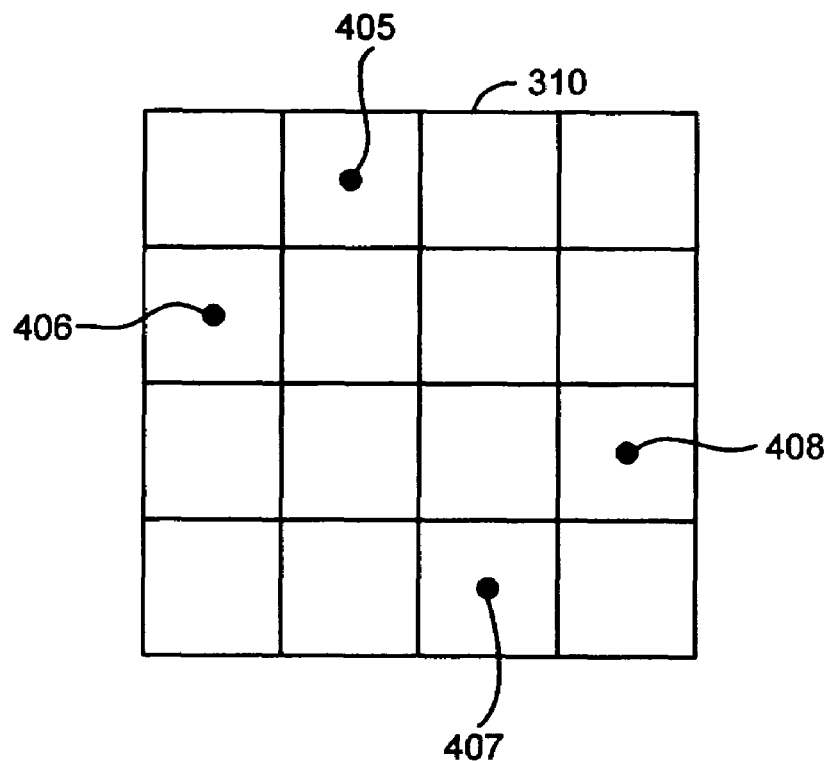
FIG. 4A is a block diagram that generally represents a single pixel divided into a grid with sample points within the pixel in accordance with various aspects of the invention.

To avoid or reduce aliasing, each pixel may be sampled at multiple points within the pixel as shown in FIG. 4A which is a block diagram that generally represents a single pixel divided into a grid with sample points within the pixel in accordance with various aspects of the invention. The grid may not be displayed and is shown to illustrate relative positions of the sample points. A separate layer of content may be created from the image data for each of the sample points 405-408.

In rendering a layer, the image content may be offset by the distance the layer's associated sample point is from the center of the pixel and then rendered. For example, in rendering the layer associated with the sample point 407, the image content may be moved up and to the left such that the point in the image corresponding to the sample point 407 is over the center of the pixel 310. Similarly, in rendering the layer associated with the sample point 406, the image content may be moved down and to the right such that the point in the image corresponding to the sample point 406 is over the center of the pixel 310.

In addition, in rendering the layers, the opacity of the layers may be set such that lower layers of content are partially visible through higher layers. For example, for 3D content consisting of an opaque 3D object and an opaque background, the layers, from back to front, may have their opacities set to 1, ½, ⅓, . . . , 1/N, respectively. This way the bottom layer is fully opaque and each successive layer may contribute an equal amount to the final pixel color.

During rendering, a layer may be blended with the layers that have already been rendered using source-over blending (also sometimes referred to as opacity blending) techniques. When two pixels are blended with source-over techniques, the color of the resulting pixel may be obtained from the following formula:

FinalColor=Opacity*ForegroundPixelColor+(1.0−Opacity)*BackgroundPixelColor where Opacity corresponds to the opacity of the foreground pixel and where an opacity of 0 is completely transparent and an opacity of 1 is completely opaque. Thus, if a foreground pixel has an opacity of 0.5 and a color of white and a background pixel has color of black, the resulting blended pixel will have color of 50% grey (half black and half white).

In three color channels, the colors in a pixel that is a blend of a foreground and background pixel may be represented by the following formulas:

$R = A_F * R_F + (1 - A_F) * R_B$ $G = A_F * G_F + (1 - A_F) * G_B$ $B = A_F * B_F + (1 - A_F) * B_B$ where R=red, G=green, B=blue, $A_F$=opacity of the foreground pixel, $R_F$, $G_F$, $B_F$=red, green, and blue of the foreground pixel, respectively, and $R_B$, $G_B$, $B_B$=red, green, and blue of the background pixel, respectively.

In one aspect of the invention, in a system that uses the formulas above to blend colors from different layers, anti-aliasing may be performed by determining the sampling pattern, determining the opacity for each layer, and rendering the layers from back to front while blending them. As will be seen below, different sampling patterns and methods for determining opacity may be performed depending on the nature of the image. In addition, even the sampling order may be changed depending on the nature of the image.

Figure 5:
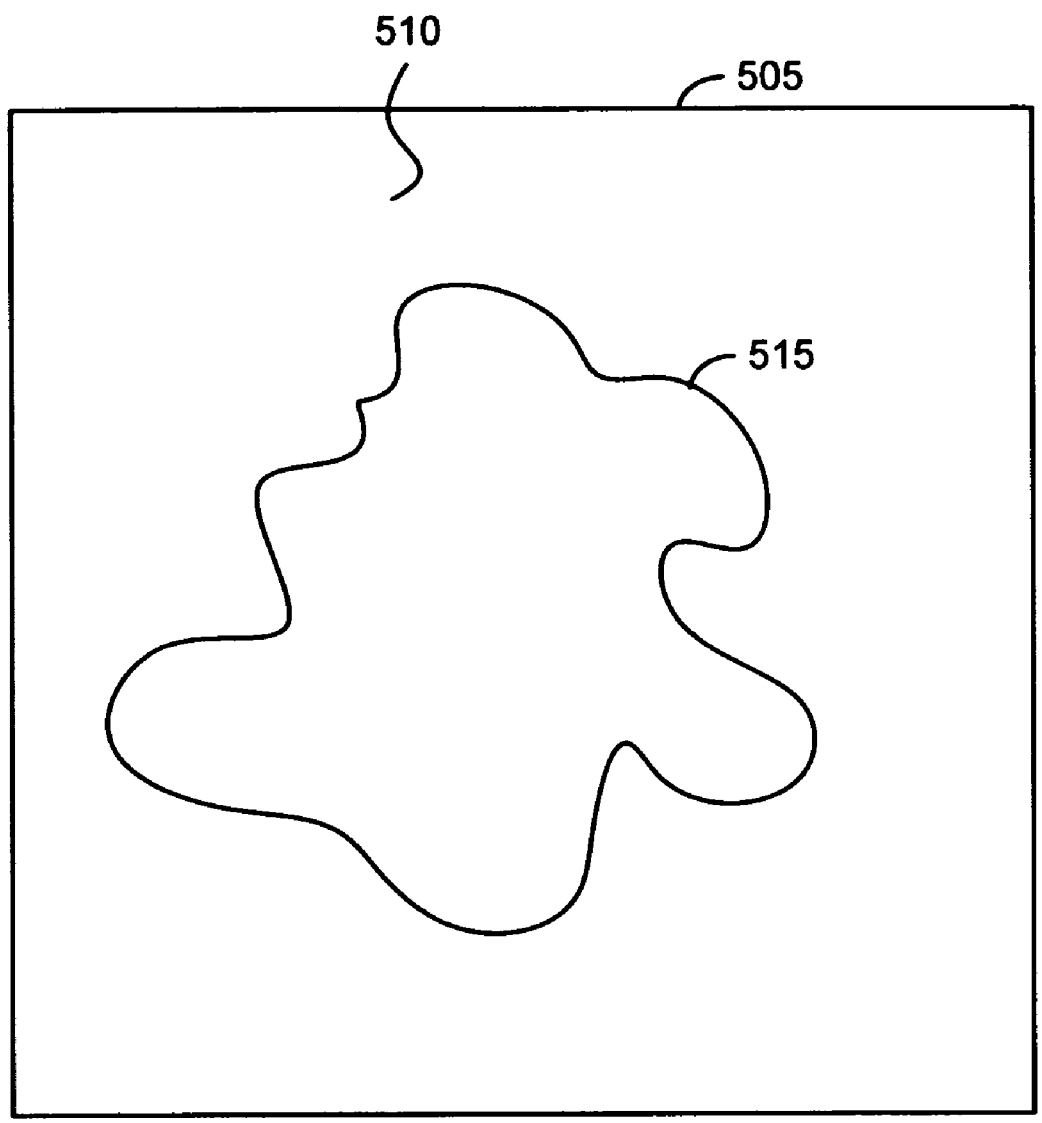
FIG. 5 is a block diagram showing content and background of an image in accordance with various aspects of the invention.

Images may be categorized into several classes, including:

1. An image with an opaque content and opaque background. For example, referring to FIG. 5, which is a block diagram showing content and background of an image in accordance with various aspects of the invention, an image 505 may have opaque content 515 and an opaque background 510.

2. An image with opaque content and a transparent background. For example, referring to FIG. 5, an image 505 may have opaque content 515 and a transparent background 510.

3. An image with content and background of the same opacity in which after rendering it is desired to have a partially transparent image (e.g., while fading an image). For example, referring to FIG. 5, an image 505 may have content 515 and background 510 of the same opacity (e.g., opacity 0.5).

4. An image with a transparent background and partially transparent content. For example, referring to FIG. 5, an image 505 may have partially transparent content 515 and a transparent background 510.

When rendering the layers, each layer may be clipped at the edge of the drawing surface. This may remove any aliasing that might occur at the edges of the image background. For example, when rendering the first layer, the opacity may be set to one (i.e., fully opaque). Any edges at the edge of the image that do not have pixels from other layers over them may not get any contribution from other layers and may be aliased. By clipping at the edge of the drawing surface, this problem may be avoided.

In one embodiment, for images of classes 1, 3, and 4, the sample points 405-408 of FIG. 4A may be used in rendering the layers. The sample points 405-408 may be sampled (and hence layers associated therewith drawn) in any order. The foreground edges may be anti-aliased by blending with the background while the background edges that are moved outside the edges of the drawing surface may be clipped for anti-aliasing. In this embodiment each layer may be set with an opacity of 1/n where n is the order in which the layer is rendered.

Figure 4B:
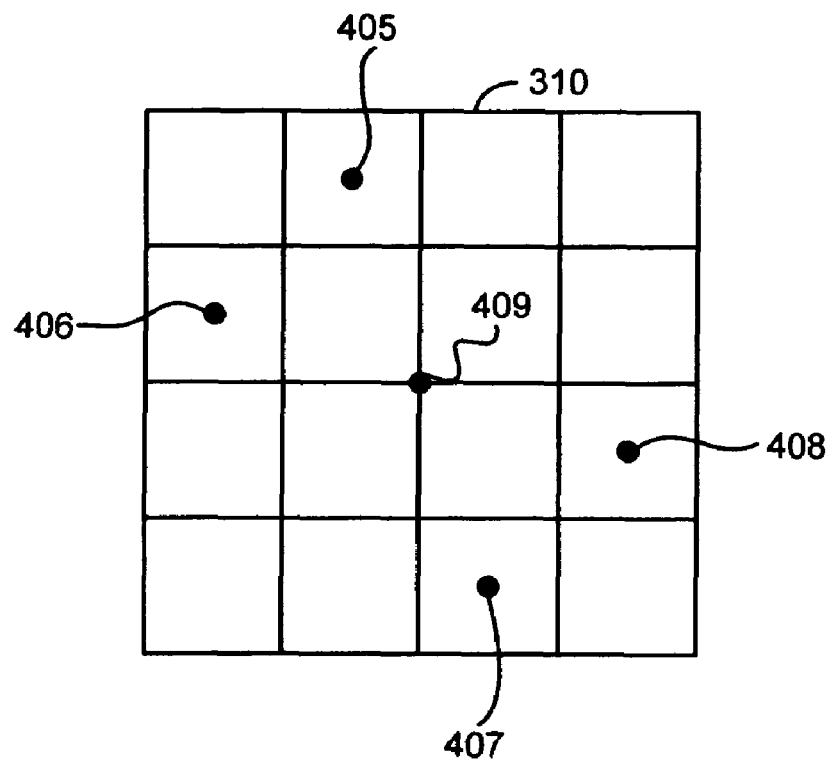
FIG. 4B is a block diagram that generally represents a single pixel divided into a grid and sample points within the pixel in accordance with various aspects of the invention.

FIG. 4B is a block diagram that generally represents a single pixel divided into a grid and sample points within the pixel in accordance with various aspects of the invention. The grid may not be displayed and is shown to illustrate relative positions of the sample points. This pixel has 5 sample points 405-409.

The sampling pattern of FIG. 4B may be used for images of class 2 or images of any class, if desired. The first point sampled is sample point 409. Then, in one embodiment, sampling proceeds by jumping from a second sampling point in one corner to a third sampling point at another corner (where the preferred next point is the farthest from the current sample point). For example, sampling may proceed from the sample point 409 to the sample point 405 and then to the sample point 407. As another example, sampling may proceed from the sample point 409 to the sample point 408 and then to the sample point |406|.

After the third sample point is sampled, a fourth and then a fifth sample point (of the two remaining sample points) are sampled. Continuing from the third sample point 405, sampling may proceed to the sample point 408 and then to the sample point 406. In another example, continuing from the third sample point of 406, sampling would continue to the sample point 407 and then to the sample point 405. Sampling sample points in the order described above may be more effective at anti-aliasing than other sampling orders.

In another embodiment, after sampling the sample point 409, the other points are sampled in any desired order.

Taking the first sample at the sample point 409 may help to reduce artifacts that may occur by sampling the points shown in FIG. 4A, particularly with respect to images with opaque content and a transparent background.

Note, although 4 and 5 sample points have been mentioned, in other embodiments, more, fewer, and differently-placed sample points may be used.

Figure 6:
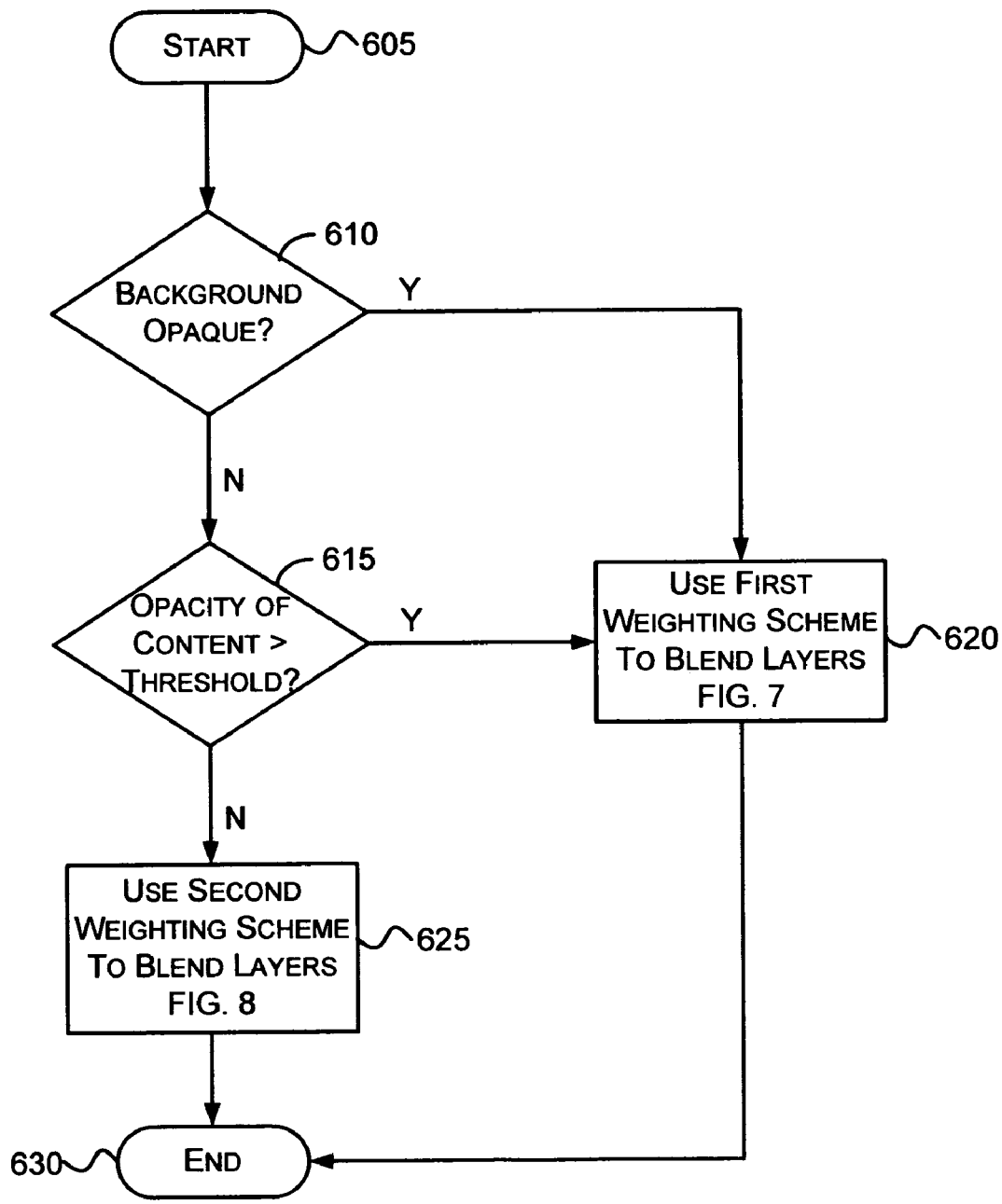
FIG. 6 is a flow diagram that generally represents actions that may occur in anti-aliasing in accordance with various aspects of the invention.

FIG. 6 is a flow diagram that generally represents actions that may occur in anti-aliasing in accordance with various aspects of the invention. At block 605, the actions start.

At block 610, a determination is made as to whether the background is opaque. If so, the actions continue at block 620; otherwise, the actions continue at block 615.

At block 615, a determination is made as to whether the opacity of the content is greater than a threshold. If so, the actions continue at block 620; otherwise, the actions continue at block 625. One exemplary threshold is 91%. In one embodiment, if the opacity of the content is greater than 91%, the actions continue at block 620. In other embodiments, other thresholds may be used.

Figure 7:
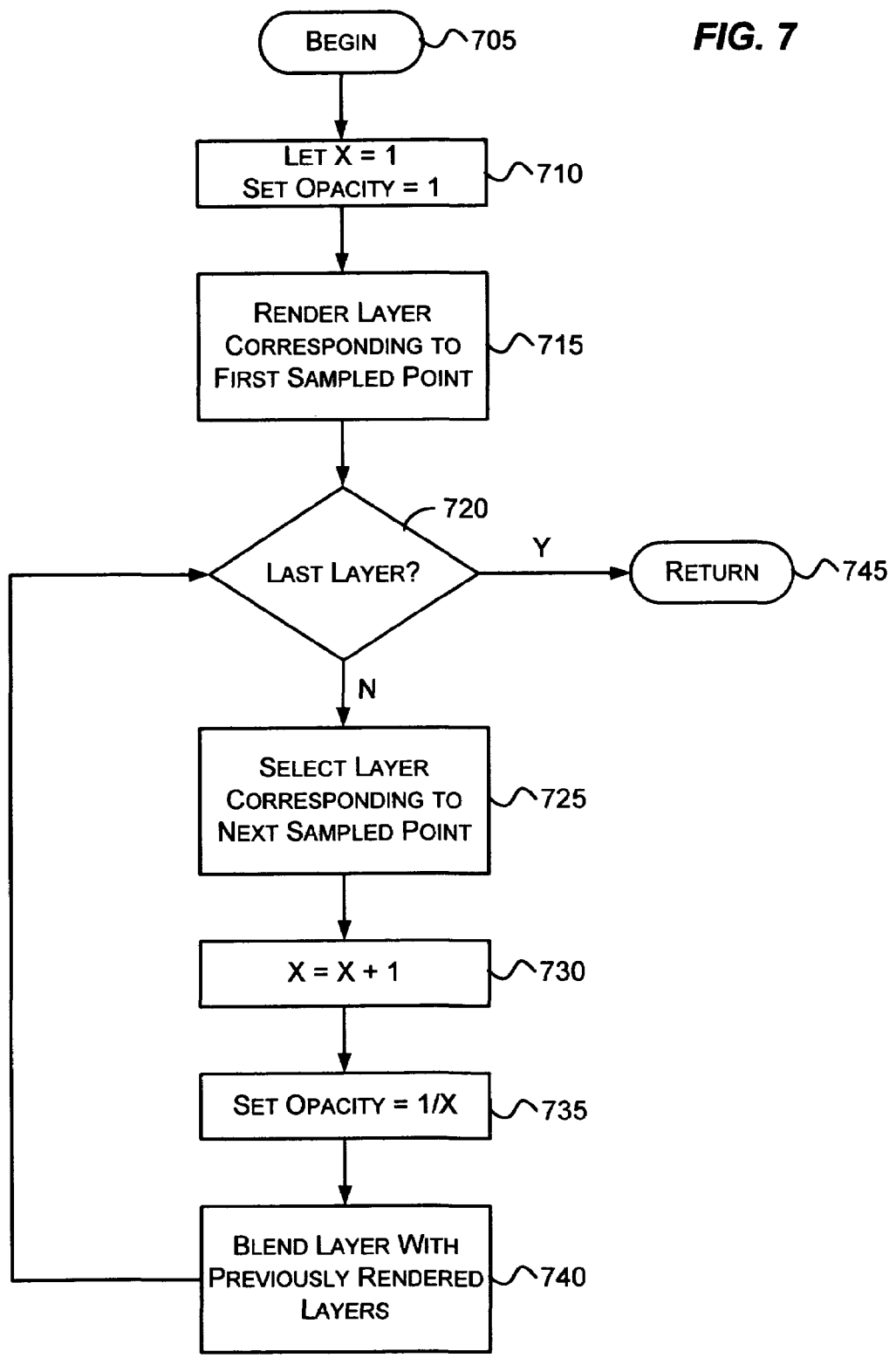
FIG. 7 is a flow diagram that generally represents actions corresponding to block 620 of FIG. 6 that may occur in anti-aliasing in accordance with various aspects of the invention.

At block 620, a first layer opacity weighting scheme is used to blend layers as described in more detail in conjunction with FIG. 7.

Figure 8:
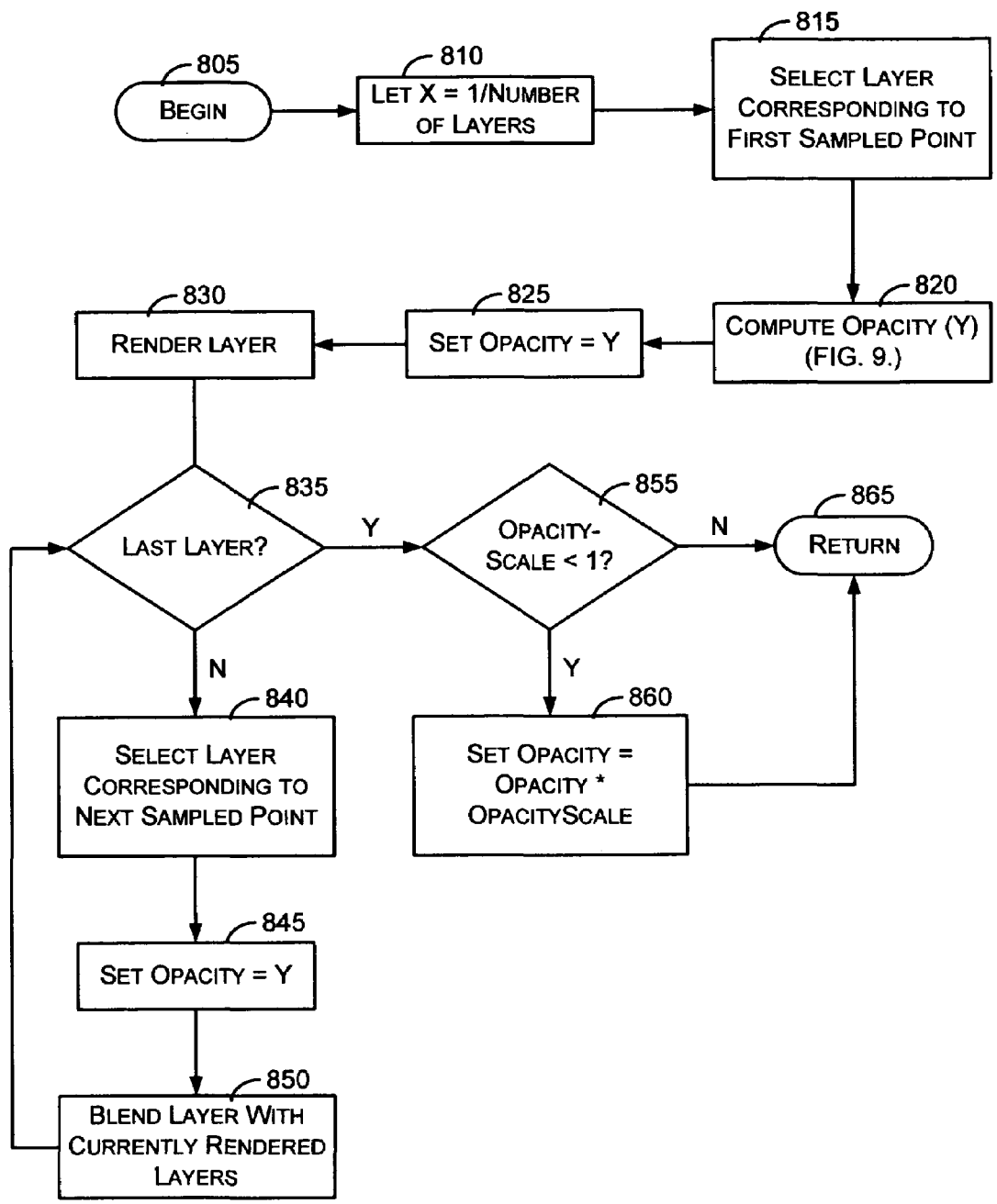
FIG. 8 is a flow diagram that generally represents actions corresponding to block 625 of FIG. 6 that may occur in anti-aliasing in accordance with various aspects of the invention.

At block 625, a second layer opacity weighting scheme is used to blend layers as described in more detail in conjunction with FIG. 8.

At block 630, the actions end.

FIG. 7 is a flow diagram that generally represents actions corresponding to block 620 of FIG. 6 that may occur in anti-aliasing in accordance with various aspects of the invention. At block 705, the actions begin.

At block 710 a variable (e.g., X) is set to one and the opacity of the layer to be rendered (the one corresponding to the first sampled point) is set to one (i.e., fully opaque).

At block 715, the first layer is rendered at its offset position. For example, referring to FIG. 4A, if sample point 405 is the first sample point sampled, the image content is shifted down and to the right to move the sample point 405 to the center of the pixel and the layer is rendered having an opacity of one.

At block 720, a determination is made as to whether the current layer is the last layer to be rendered. If so, the actions continue at block 745; otherwise, the actions continue at block 725. Typically, the number of layers equals the number of sample points within each pixel.

At block 725, the layer corresponding to the next sampled point is selected. For example, referring to FIG. 4A, if sample point 407 is the next sampled point, the layer corresponding to the sample point 407 is selected.

At block 730, X is incremented by one. This action is performed in preparation for setting the opacity of the currently-selected layer. At block 735, the opacity of the currently-selected layer is set to one divided by X (i.e., 1/X). This has the effect of giving each of the layers the potential for the same contribution to the color of each pixel.

At block 740, the currently-selected layer is blended with the layers that have already been rendered. For example, referring to FIG. 4A, the layer corresponding to the sample point 407 may be blended with the layer corresponding to the sample point 405. The actions associated with blocks 720-740 may continue until all layers have been rendered.

At block 745, the actions continue at block 630 of FIG. 6.

FIG. 8 is a flow diagram that generally represents actions corresponding to block 625 of FIG. 6 that may occur in anti-aliasing in accordance with various aspects of the invention. At block 805, the actions begin.

At block 810, a variable (e.g., X) is set to 1 divided by the number of layers to be rendered. At block 815, the layer corresponding to the first sampled point is selected. At block 820, the opacity (e.g., Y) to apply to each of the layers is computed as described in conjunction with FIG. 9.

In one embodiment, each of the layers is drawn with the same opacity. While this may not provide an equal contribution to the final image from each layer, in some subjective tests, it appears to have the effect of anti-aliasing the image better than a 1/n opacity (where n is the order in which the layer is rendered). After the layers are rendered, the opacity of the image may be scaled, if desired, to a selected opacity. This may be useful, for example, to preserve color accuracy that may be introduced by round-off errors.

At block 825, the opacity of the layer is set to Y. At block 830, the layer is rendered (with its appropriate offset depending on the sample point corresponding to the layer).

At block 835 a determination is made as to whether the current layer is the last layer to be rendered. If so, the actions continue at block 855; otherwise, the actions continue at block 840.

At block 840, the layer corresponding to the next sampled point is selected. At block 845, the opacity of the layer is set to Y. At block 850, the layer is rendered and blended with the currently rendered layers. The actions associated with block 835-850 continue until the last layer has been rendered.

At block 855, a determination is made as to whether the opacity of the final composite needs to be scaled. If so, the actions continue at block 860; otherwise, the actions continue at block 865.

At block 860, the opacity of the final composite may be scaled by multiplying the opacity of the pixels within the layer by a scaling factor (e.g., OpacityScale).

At block 865, the actions return and continue at block 630 of FIG. 6.

Figure 9:
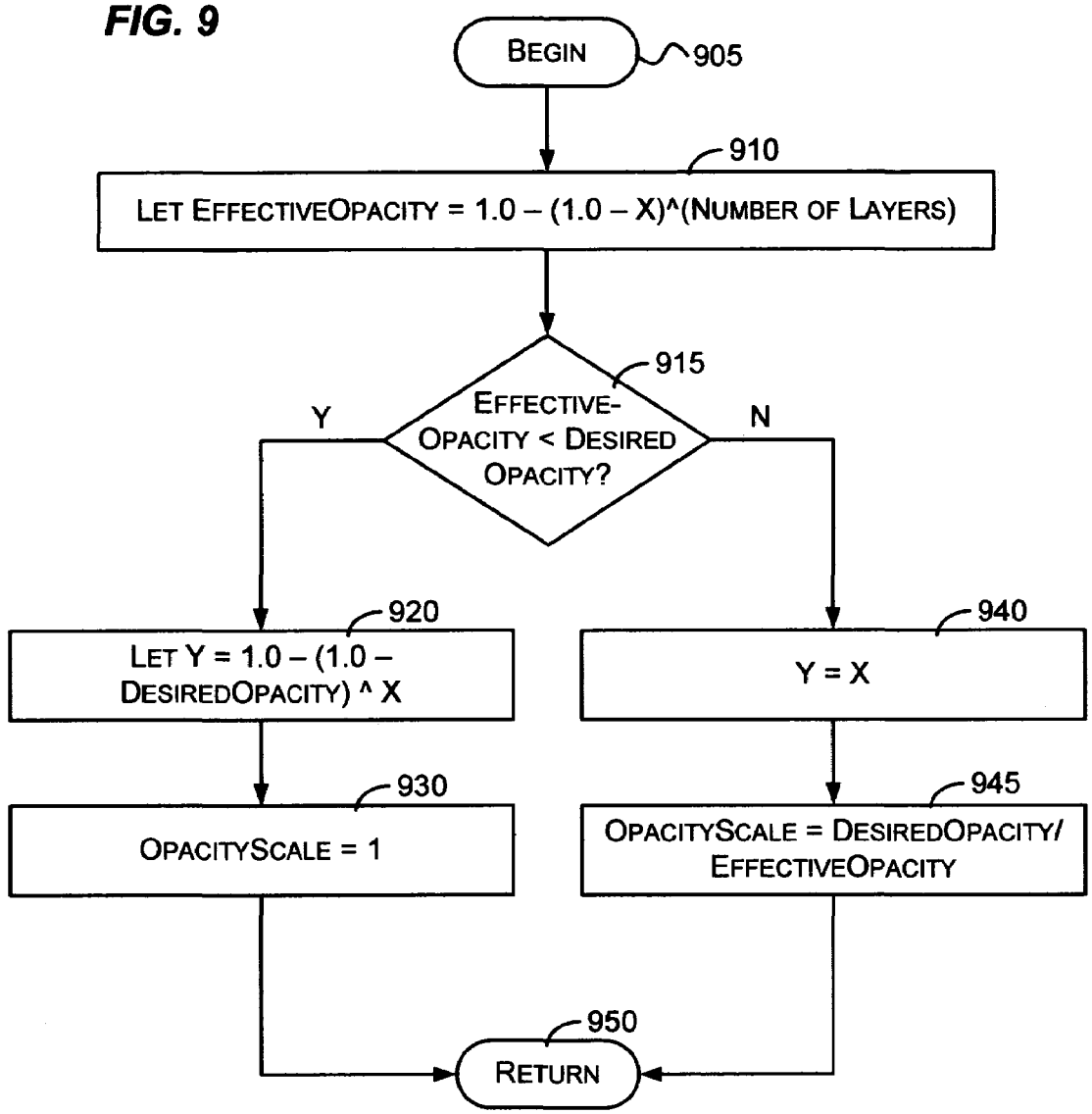
FIG. 9 is a flow diagram that generally represents actions corresponding to block 820 of FIG. 8 that may occur in anti-aliasing in accordance with various aspects of the invention.

FIG. 9 is a flow diagram that generally represents actions corresponding to block 820 of FIG. 8 that may occur in anti-aliasing in accordance with various aspects of the invention. At block 905, the actions begin.

At block 910, a variable (e.g., EffectiveOpacity) is set to $1.0-(1.0-X)^\wedge$ (i.e., raised to the power of) the number of layers. The effective opacity is the opacity that would result from blending the layers with an opacity of X (i.e., 1.0/number of layers).

At block 915, a determination is made as to whether the effective opacity is less than a desired opacity. If so, the actions continue at block 920; otherwise, the actions continue at block 940.

At block 920, a variable (e.g., Y) is set to $1.0-(1.0-$the desired opacity$)^\wedge$ (i.e., raised to the power of) X. Y represents the opacity applied to each layer during rendering and causes the final rendered image to have an opacity at or near the desired opacity. At block 930, a variable is set (e.g., OpacityScale) to indicate that no scaling is needed of the opacity of the final rendering.

At block 940, a variable (e.g., Y) is set to X (i.e., 1/the number of layers). Again, Y may represent the opacity applied to each layer during rendering. At block 945, a variable (e.g., OpacityScale) is set to desired opacity/effective opacity. The OpacityScale may be used on the final image to scale the opacity downward to a desired opacity. Scaling the opacity downward after rendering the layers may avoid round-off errors that may be introduced if each layer were simply made more transparent.

At block 950, the actions return and continue at block 825.

The actions described above may be performed by one or more computers (e.g., computer 110 of FIG. 1) and/or any components thereof (e.g., graphics processing units) and may be distributed across several computers without departing from the spirit or scope of the invention. Calculations needed for the actions may be performed by the CPUs of the one or more computers and/or by the graphics processing units. Memory used may be system memory and/or memory of graphics cards.

As can be seen from the foregoing detailed description, there is provided a method for anti-aliasing images. While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer-readable storage medium having computer-executable instructions that, when executed by a processor, cause a computing system to perform an anti-aliasing process on an image, the anti-aliasing process comprising:
    accessing an image and determining that anti-aliasing is to occur on the image, wherein the image includes content at least partially surrounded by a background;
    sampling a pixel of the image at a plurality of sample points, wherein at least some of the sample points are offset from a center of the pixel;
    determining a color of the image at each of the plurality of sample points;
    rendering a plurality of layers of the pixel, each layer corresponding to a different sample point and having the color determined at such sample point, wherein each layer also has a different opacity, and wherein each sample point offset from the center of the pixel is shifted towards the center of the pixel when rendered;
    blending the layers corresponding to the sample points to render the image based on the color at each of the plurality of sample points.

2. The computer-readable storage medium of claim 1, wherein the image comprises content surrounded by a background having an opacity, and further comprising determining the opacity of the background, and wherein blending the layers corresponding to the sample points to render the image based on the color comprises clipping edges of the image.

3. The computer-readable storage medium of claim 2, wherein the background is opaque.

4. The computer-readable storage medium of claim 1, wherein the content has an opacity greater than a threshold.

5. The computer-readable storage medium of claim 4, wherein the threshold is ninety-one percent.

6. The computer-readable storage medium of claim 4, wherein the pixel has an upper left and lower right corner and wherein the sample points comprise a first sample point lower and within one half pixel of the upper left corner of the pixel, a second sample point above and within one half pixel of the lower right corner of the pixel, a third sample point to the right and within one half pixel of the upper left corner of the pixel, and a fourth sample point to the left and within on half pixel of the lower right corner of the pixel.

7. The computer-readable storage medium of claim 6, wherein the sample points are sampled in order from the first sample point to the fourth sample point, and wherein the layers corresponding to the sample points are rendered sequentially in the same order.

8. The computer-readable storage medium of claim 6, wherein the sample points further comprise a fifth sample point in the center of the pixel, wherein the layer associated with the fifth sample point is rendered first.

9. In a computing environment, a method for anti-aliasing an image, the method comprising:
    determining locations of a plurality of sample points within a pixel, wherein at least some of the sample points are offset from a center of the pixel;
    determining an order in which to take samples at each of the plurality of sample points;
    determining opacities to apply to layers used to display an image, wherein each sample point corresponds to a different opacity;
    determining an order in which to render the layers, wherein the order orders the layers from first to last to render and is based on the order in which samples are taken at the plurality of sample points;
    setting the first of the layers to the opacity that applies to it;
    rendering the first of the layers;
    setting the second of the layers to the opacity that applies to it; and
    rendering the second of the layers and shifting the sample point corresponding to the second layer towards the center of the pixel and further blending the opacities that apply to the first and second layers.

10. The method of claim 9, wherein the image comprises content surrounded by background, wherein determining opacities to apply to layers used to display an image comprises determining if the background of the image is opaque or if the content has opacity exceeding a threshold, and wherein if the background of the image is opaque or if the opacity of the content exceeds the threshold, the opacity that applies to each layer is calculated by dividing one by a number that represents an order in which the layer is rendered.

11. The method of claim 9, wherein determining one or more opacities to apply to layers used to display an image comprises determining an effective opacity that would result from blending the layers and determining whether the opacity is less than a selected opacity.

12. The method of claim 11, wherein if the opacity is less than a selected opacity, computing a per-layer opacity which results in a desired final opacity of the blended layers.

13. The method of claim 11, further comprising calculating a scaling amount by which to scale an opacity of the rendered image.

14. The method of claim 13, wherein the scaling amount reduces the opacity of the rendered image.

15. The method of claim 9, wherein each layer after the first layer is rendered by shifting the sample point corresponding to the layer towards the center of the pixel.

16. The method of claim 9, wherein the opacity of each layer has an opacity determined according to an equation of the form: $O=1/n$, where $O$ is the opacity of the layer being rendered, and $n$ is equal to the order of the layer being rendered, such that the first of the layers has an opacity equal to one and the second of the layers has an opacity equal to one half.

17. The method of claim 9, wherein each layer contributes equally to a final pixel output.

18. In a computing environment, an apparatus, comprising:
    memory arranged to store graphics data related to an image; and
    a processing unit arranged to perform actions and to store graphics data derived by the actions in the memory, the actions, comprising:
        identifying the image and determining that anti-aliasing is to occur on the image,
        determining a first opacity of a portion of the image, sampling a pixel of the image at a plurality of points offset from a center of the pixel, determining a second opacity to apply to a first layer used to render the image based on the first opacity, for each of the plurality of points, rendering a layer of the image for the pixel, wherein the first layer is rendered with the second opacity, and wherein each additional layer has a different opacity, and wherein each layer corresponding to a point offset from the center of the pixel is shifted towards the center of the pixel when rendered; and blending the layers corresponding to the plurality of points to render the image based on samples at each of the plurality of points.

19. The apparatus of claim 18, wherein the first opacity comprises an opacity of a background that surrounds content in the image, and wherein determining a second opacity to apply to a first layer used to render the image based on the first opacity comprises using a first value for the second opacity if the opacity of the background is opaque and using a second value for the second opacity if the opacity of the opacity of the content is less than a threshold.

* * * * *